June 18, 1957   A. F. VINING   2,796,481
DEVICES FOR FACILITATING THE PARKING OF AN AUTOMOTIVE VEHICLE
Filed May 17, 1954
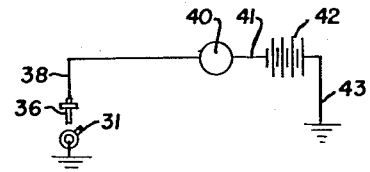
Fig. 6
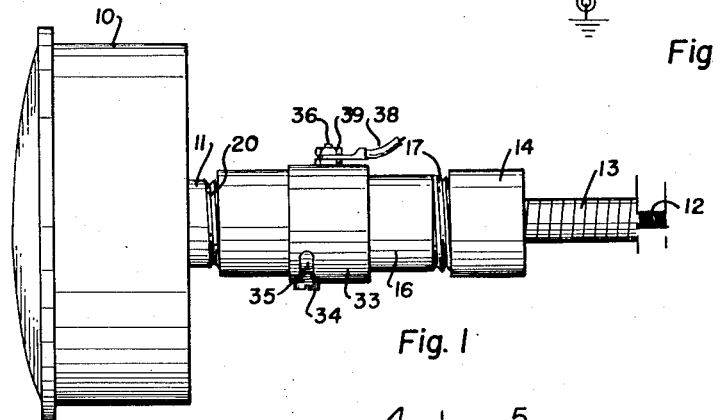
Fig. 1
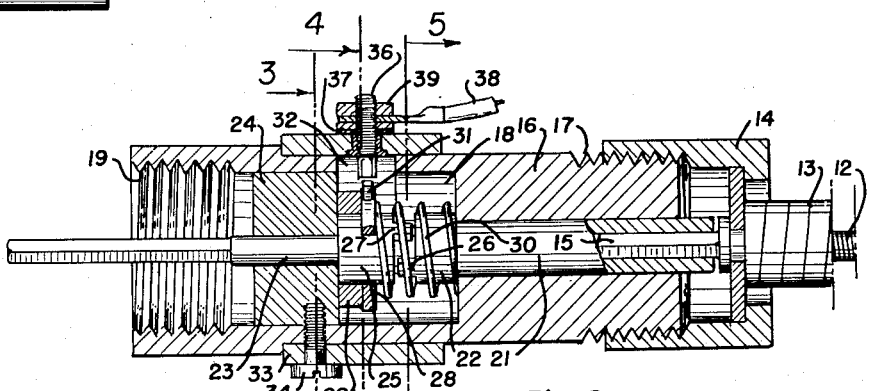
Fig. 2
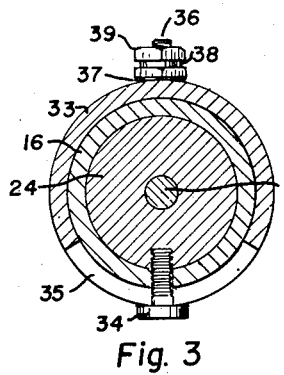
Fig. 3
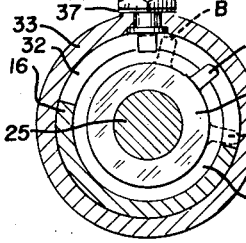
Fig. 4
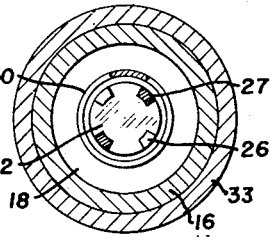
Fig. 5
INVENTOR.
Arthur F. Vining
BY
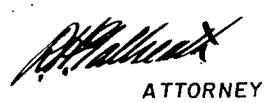
ATTORNEY

2,796,481

DEVICES FOR FACILITATING THE PARKING OF AN AUTOMOTIVE VEHICLE

Arthur F. Vining, Cheyenne, Wyo.

Application May 17, 1954, Serial No. 430,251

3 Claims. (Cl. 200—61.39)

This invention relates to a parking indicator for automobiles, and has for its principal object the provision of an electric signal device which will indicate to the driver of an automobile being backed into a street parking space the proper time for reversing the steering wheel so as to accurately swing the front of the car into the parking space.

Another object of the invention is to provide a small, simple and highly efficient circuit closing device which can be quickly and easily positioned between an automobile speedometer and its flexible drive shaft, and which will act to close a signal circuit when the speedometer drive shaft has rotated a predetermined number of rotations in a reverse direction and to so construct the device that it will not interfere with the normal operation of the automobile speedometer.

A further object is to provide a circuit-closing device for signal circuits that may be preset to accurately adjust it to automobiles of various wheel bases and lengths.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved circuit-closing device for parking signal circuits, illustrating the device in place between a conventional speedometer and a conventional flexible speedometer drive shaft;

Fig. 2 is an enlarged, longitudinal, vertical section through the circuit-closing device;

Figs. 3, 4, and 5 are cross-sections through the device, taken on the lines 3—3, 4—4, and 5—5, respectively, Fig. 2; and Fig. 6 is a diagram illustrating a signal circuit in which the circuit-closing device may be used.

A conventional speedometer is indicated in the drawing at 10, with its shaft-receiving nipple at 11 and nipple threads at 20. A flexible speedometer drive shaft is illustrated at 12, with its flexible sheath at 13 and terminal coupling at 14. This conventional, flexible, speedometer drive shaft terminates in a square stud 15 adapted to extend into a female shaft coupling within the nipple 11, when the coupling 14 is threaded onto the nipple 11, to drive the speedometer.

The improved circuit-closing device comprises a cylindrical body 16 provided with external threads 17 at its forward extremity corresponding to the conventional threads 20 on the speedometer nipple 11 and designed to receive the shaft coupling 14. A concentric cavity 18 is formed in the rear extremity of the body 16 and provided with internal threads 19 adapted to be threaded onto the threads 20 of the speedometer nipple 11.

A female stub shaft 21 is rotatably mounted in the forward extremity of the body 16 and terminates in an enlarged head 22 within the cavity 18. The forward extremity of the stub shaft 21 is provided with a square socket for receiving the square stud 15 of the flexible speedometer drive shaft 12. A male stub shaft 23 is rotatably mounted in a bearing bushing 24 in the rear extremity of the cavity 18 in axial alignment with the stub shaft 21. The male stub shaft also terminates in an enlarged head 25 within the cavity 18.

The two heads 22 and 25 are maintained in spaced-apart relation within the cavity 18, and the head 22 is provided with a pair of projecting, diametrically-spaced clutch dogs 26, and the head 25 is provided with a similar diametrically-spaced pair of clutch dogs 27. The dogs 26 contact the dogs 27 to transmit rotation from the stub shaft 21 to the stub shaft 23, with an interval of lost motion during each reversal in direction of the shaft 21.

A friction washer 28 is rotatably mounted on the head 25 against a set collar 29 which is affixed to and rotates with the head 25. The friction washer 28 is constantly urged into frictional engagement with the set collar 29 by means of a compression spring 30 and carries a radially projecting contact-closing tab 31 which travels within an arcuate, circumferentially extending slot 32 in the body 16.

The slot 32 is covered and enclosed by means of a shifting collar 33 which circumferentially surrounds the body 16 and can be locked in any desired circumferential position thereon by means of a suitable clamp screw 34. The clamp screw is threaded into the body 16 and into the bearing bushing 24 to maintain the latter in place, and extends through an arcuate, circumferential slot 35 in the collar 33.

A contact stud 36 extends through the collar 33 into the slot 32 and is electrically insulated from the collar 33 by means of suitable insulation 37. The inner extremity of the contact stud 36 extends into the path of movement of the tab 31 so that the latter can contact the stud and close an electrical circuit therewith. A circuit wire 38 is secured on the stud 36 by means of suitable clamp nuts 39.

The wire 38 may extend to one terminal of a signal device such as a light, as indicated at 40 in Fig. 6, the opposite terminal of the light being connected by means of a conductor 41 with the car battery, indicated at 42, which is grounded, as indicated at 43. The friction washer 28 and its tab 31 are similarly grounded through the body 16.

Operation

Let us assume that the device is in place and connected in a signal circuit on an automobile, and that the automobile is driven past an open street parking space to a position alongside a car parked ahead of the desired parking space. When the automobile comes to rest, the tab 31 will be in the broken line position "A" in Fig. 4 due to the clockwise rotation of the speedometer drive shaft.

Now let us assume that the driver turns his steering wheel to swing the front wheels at an inward angle and backs the automobile into the parking space as usual. This causes the speedometer drive shaft to rotate in reverse so as to cause the stub shaft 21 to rotate in a counter-clockwise direction so as to cause the dogs 26 to rotate away from one side of the dogs 27 and into contact with the other side thereof so as to initiate rotation of the stub shaft 23. The rotation of the latter shaft will be communicated to the friction washer 28, causing the tab 31 to move to the broken line position "B" in Fig. 4 and into contact with the stud 36 so as to close the circuit to the signal light 40.

Upon receipt of the signal the driver will immediately turn his steering wheel in the opposite direction to swing the front wheels at an outward angle to cause the front of the automobile to swing into the parking space as the automobile is backed to the parked position.

Thus, in effect the signal device indicates when the automobile has been backed a predetermined distance. This distance has been determined in advance to give the most satisfactory parking results, and the selected distance has been preset by rotating the collar 33 to position the contact stud 36 at the desired point, and then setting the collar in the preselected position by means of the set screw 34. No further adjustments are required for that particular automobile.

When the automobile leaves its parking space, the stub shaft 21 will rotate clockwise, the dogs 26 will pick up the dogs 27, and the speedometer will be driven as usual. The tab 31 will return to the position "A" and remain stationary in lubricated, frictional engagement between the spring 30 and the set collar 29 until the direction of travel is again reversed.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. In a parking signal device, an electrical contact closer adapted to be positioned between an automobile speedometer and a speedometer drive shaft comprising: a body having a first extremity for connection to a speedometer and a second extremity for connection to a speedometer drive shaft housing; a female stub shaft in said first extremity adapted to receive said speedometer drive shaft; a male stub shaft in said second extremity adapted to drive said speedometer; a friction washer mounted on said male stub shaft; a circuit closing member mounted on said washer; a contact projecting into said body in the path of movement of said circuit closing member, so as to be contacted thereby, said contact being electrically insulated from said body; means for limiting the arc of movement of said circuit closing member; clutch dogs projecting from each stub shaft and adapted to engage similar dogs on the other shaft, the dogs on each shaft being spaced from the dogs on the other shaft so as to allow an arc of lost motion between said shafts when said drive shaft is reversed.

2. An electrical contact closer as described in claim 1 having a spring reacting against said friction washer and maintaining the latter in rotative frictional engagement with said male stub shaft to cause said washer to tend to rotate with the latter shaft.

3. An electrical contact closer as described in claim 1 having a circumferential slot in said body about said circuit closing device to allow space for the movement of the latter; a rotatable collar surrounding said body and said slot, said contact being carried by said collar and projecting into said slot into the path of movement of said contact closing device; and means for presetting said collar in any desired circumferential position to set the circumferential position of said contact closing device.

References Cited in the file of this patent
UNITED STATES PATENTS

| 1,191,973 | Johnson | July 25, 1916 |
| 2,132,188 | Rockett et al. | Oct. 4, 1938 |
| 2,664,477 | Lewis et al. | Dec. 29, 1953 |